US008763666B2

(12) United States Patent
Thomas et al.

(10) Patent No.: US 8,763,666 B2
(45) Date of Patent: Jul. 1, 2014

(54) ALL-ROUND LABELLING APPARATUS

(75) Inventors: Lang Thomas, Altenthann (DE); Kampmann Lutz, Moetzing (DE)

(73) Assignee: Krones AG, Neutraubling (DE)

( * ) Notice: Subject to any disclaimer, the term of this patent is extended or adjusted under 35 U.S.C. 154(b) by 210 days.

(21) Appl. No.: 12/203,637

(22) Filed: Sep. 3, 2008

(65) Prior Publication Data

US 2009/0071608 A1 Mar. 19, 2009

(30) Foreign Application Priority Data

Sep. 3, 2007 (EP) .................................... 07017190

(51) Int. Cl.
*B23D 25/12* (2006.01)
*B32B 38/04* (2006.01)

(52) U.S. Cl.
USPC ............................................ 156/521; 83/343

(58) Field of Classification Search
USPC ............ 156/510–534; 83/343, 346–348, 490, 83/494
See application file for complete search history.

(56) References Cited

U.S. PATENT DOCUMENTS 3,767,514 A * 10/1973 Blossom ...................... 156/518
3,977,617 A * 8/1976 Salmon ...................... 242/421.2
5,711,199 A * 1/1998 Hesketh et al. .................. 83/23
6,044,887 A 4/2000 Orlandi et al.
6,173,633 B1 * 1/2001 McLaughlin ..................... 83/37
6,230,597 B1 * 5/2001 Baba et al. ...................... 83/171
6,344,095 B1 * 2/2002 Kawabata et al. ............ 148/336
6,347,657 B1 * 2/2002 Bright ......................... 156/556
2001/0054343 A1 12/2001 Schinelli
2002/0174753 A1 * 11/2002 Cox ................................ 83/13
2007/0044613 A1 * 3/2007 Cohn .............................. 83/342

FOREIGN PATENT DOCUMENTS

DE 698 22 238 T2 4/2005
DE 20 2005 002793 U1 5/2005
EP 0 943 404 A2 9/1999
EP 1 279 604 A1 1/2003

* cited by examiner

*Primary Examiner* — Scott W Dodds
(74) *Attorney, Agent, or Firm* — Novak Druce Connolly Bove + Quigg

(57) ABSTRACT

A labelling machine for labelling containers may include at least a container feed means, a labelling region, a container removal means, and at least one labelling unit for processing labels from the roll. The labelling unit may comprise at least one label roll, a label feeder, a cutting device, a gripper cylinder, and at least one gluing mechanism. The cutting device may be constituted by a rotating vacuum roller and a rotating parting element which, on its circumference, has at least one parting tool, for example, a cutting blade, and the cutting device may be held by a common support device having, at least, a base part and a cover part. The support device has the same mean coefficient of thermal expansion as the rotating vacuum roller and the rotating parting element.

23 Claims, 5 Drawing Sheets

ALL-ROUND LABELLING APPARATUS

CROSS-REFERENCE TO RELATED APPLICATION

This application claims the benefit of priority of European Patent Application No. 07017190.5, filed Sep. 3, 2007, pursuant to 35 U.S.C. 119(a)-(d), the disclosure of which is incorporated herein by reference in its entirety as if fully set forth herein.

TECHNICAL FIELD

The present disclosure relates to labelling machines and, more particularly, to labelling machines for all-round labelling of containers.

BACKGROUND

Labelling operations in high-throughput sectors are usually performed with the use of endless label strips that have been wound onto a roll core to form a label roll. This type of labelling system renders possible labelling with as few interruptions as possible, since a plurality of label rolls can also be placed in a store and then transferred seamlessly into the labelling machine when required. High-speed labelling operations are thereby possible.

There is known, for example, the labelling apparatus of DE202005002793U1, which provides, inter alia, a high-speed cutter for labelling machines processing endless label strips from the roll, the cutter comprising a rotating vacuum roller and a rotating parting element. To enable the greatest possible variation in cut length to be produced, the vacuum roller and the parting element are each equipped with their own drives.

This apparatus has the disadvantage, however, that the wear on the cutting tools mounted on the parting element is very great, since the interacting elements expand during high-speed operation, and consequently the set tolerances can no longer be maintained.

There is known, in addition, DE69822238 T2, which likewise provides a high-speed labelling machine. The problem of the varying tolerances in the case of thermal expansion of components in the label cutter is circumvented in this case in that extending through the cutter there are channels, in which temperature-controlled oil circulates. Alteration of the temperature during operation is thereby prevented. A disadvantage of this arrangement is the extremely large structural resource input applied here.

It may therefore be desirable to provide a high-speed labelling machine that realizes a good labelling result throughout operation, with a simple structural resource input.

SUMMARY OF THE INVENTION

According to various aspects of the disclosure, a labelling machine may include a cutting device comprising a rotating vacuum roller and a rotating parting element. The cutting device may be held by a common support device. The mean coefficient of thermal expansion of the support device corresponds substantially to the mean coefficient of thermal expansion of the rotating vacuum roller and of the parting element. All containers, of whatever type, that are to be provided with a label from the roll can be processed by means of a labelling machine according to the disclosure. Containers may be, inter alia, cans, PET bottles, glass bottles, boxes, jars or tubs.

The labelling machine, which may be realized as a continuous-motion machine, may have a linear container feeder, at the ends of which a spacing worm or a spacing star (e.g. sawtooth star) performs the function of feeding the containers to the labelling region with the correct spacing. After the containers have been transferred to the labelling region, where labelling is effected by the provided labelling unit, they are transferred by a transfer element to the container removal region. The labelling region can be of various designs. It is possible, for example, for the items to be labelled to stand on support discs such as, for example, rotary discs, or to be transported with an under clearance, e.g. suspended or gripped at the opening. The labelling unit for all-round labelling consists of at least one label roll, a label feeder, a cutting device, a gripper cylinder and a gluing mechanism, the label strip that is to be decollated being drawn off the label roll and fed to the vacuum roller and the cutting device via the label feeder. The transport of the label strip on the vacuum roller may be effected without slip, but in certain cases (e.g. for the purpose of correcting the cutting position) can also be performed with slip. The label strip present on the vacuum roller is severed by the cutting device. The labels, decollated in this way, are transferred to the gripper cylinder, which, as the labels are guided past the gluing mechanism, provides them with a start adhesive strip and an end adhesive strip or with a glue film that is complete to a greater or lesser extent. The gripper cylinder transfers the label onto the item to be labelled, the label being wound on by the item's own rotation. The end glue strip is then glued onto the item or such that it overlaps the label.

The cutting device is preferably constituted by a rotating vacuum roller and a rotating parting element, the parting element having at least one parting tool on its circumference. The parting tool may be a cutting tool, for example, a cutting blade, the parting tool also being able to be realized as a stamping tool.

The cutting device may be held by a support device, which has at least a base part and a cover part. According to an exemplary development of the invention, the support device is of such design that the vacuum roller and the rotating parting element are mounted directly or indirectly in the support device. Connecting elements, providing a mechanical, force-closed coupling, can be mounted between the base part and the cover part. The base part and the cover part may each be realized as a single piece, and have approximately equal mean coefficients of thermal expansion. The mean coefficient of thermal expansion is referred to several times in this document. It means the effective coefficient of thermal expansion that is actually present. It may be the case, for example, that the base part is constructed from various materials that each have differing coefficients of expansion. The mean coefficient of thermal expansion is therefore intended to indicate the expansion of the various materials, e.g. of the base part, that exists in practice.

According to various aspects, the support device is so realized that its mean coefficient of thermal expansion corresponds to the mean coefficient of thermal expansion of the vacuum roller and of the rotating parting element. According to a further exemplary development of the invention, the base part and the cover part of the support device are of the same material, such that an approximately equal coefficient of thermal expansion is thereby obtained. In some aspects, the support device and the vacuum roller and the cutting blade are made of the same basic material, such that an approximately equal coefficient of thermal expansion is thereby obtained. Exemplary material for the said parts may comprise, but is not limited to, aluminium or steel. The steel may comprise stainless steel. Thus, the cylindrical basic structure of the vacuum roller may be composed mainly of aluminium, as is the rotating parting element, but this does not mean that the elements referred to are composed only of aluminium.

Another embodiment of the invention consists in that the parting element, the vacuum roller and the support device are composed of steel, such that, here likewise, a substantially equal coefficient of thermal expansion exists.

According to a further exemplary development, there are mounted on the vacuum roller counter elements, with which the parting tool can be brought into contact for the purpose of severing the label, the counter elements being constituted by metal bars. The operation of cutting the label is effected through the contact of the parting tool and the counter element. The metal bars may be inserted in the vacuum cylinder in such a way that they do not project out from the cylinder surface.

According to an exemplary development of the invention, the rotating parting element has at least two parting tools, and in some aspects exactly two parting tools, for severing the label. In the case of more than one parting tool being fastened to the rotating parting element, the rotational speed of the parting element is reduced for the same labelling unit throughput, since, from one label cut to the next it is necessary to effect a rotation, not of 360°, but of 180° in the case of two parting tools, and a rotation of the parting element of only 90° in the case of four parting tools.

According to some aspects, the rotating vacuum roller comprises two counter elements, at which the parting tool can execute the cut through the label. According to an exemplary development of the invention, there are at least four, and in some aspects exactly four, counter elements on the rotating vacuum roller. If the counter elements are integrated into the rotating vacuum roller in such a way that three counter elements are mounted with a respective spacing of 120°, and the fourth counter element with a spacing of 180° in relation to any one of the three counter elements, there results the advantage that it is possible to produce, by means of one rotating vacuum roller, label lengths corresponding to one times the circumference, two thirds of the circumference, one half of the circumference, or one third of the circumference of the vacuum roller.

Other arrangements of the counter elements are also conceivable, however, such as, for example, the equidistant arrangement of six counter elements, such that they are respectively spaced at 600 in relation to one another.

An arrangement that is particularly flexible in respect of the label lengths to be produced is obtained if the entire circumference of the vacuum roller is realized as a counter element, i.e., the surface material of the vacuum roller corresponds to that of the counter elements. As a result, the parting tool can be brought into engagement with the rotating vacuum roller at any point for the purpose of cutting. Aligning of the vacuum roller to the separating tool is therefore not necessary.

According to an exemplary development, both the rotating vacuum roller and the rotating parting element are each equipped with their own motorized drive, the drive being, for example, a servo drive. By means of this design it is possible to generate both synchronous and asynchronous motion patterns of both the vacuum roller and the parting element, whereby the greatest possible flexibility is achieved in respect of the length of the labels to be produced. For certain applications, it may be sufficient for the two motorized drives to be realized as stepper motors.

Equipping the parting element and the vacuum roller each with their own drive has the advantage that a cutting method adapted to the respectively existing situation can be applied as flexibly as possible. If, for example, the parting element has two parting tools, but one is worn, then it is possible for the parting element to be rotated by 360° from one cut to the next, in order that the worn parting tool is no longer used. This is advantageous, since changing of the parting element can then be performed when the machine is being serviced in any case. Additional interruptions can thus be minimized to a necessary number.

According to an exemplary development of the invention, the circumferential speeds of the parting element and of the vacuum roller, which can differ entirely during a revolution, are matched to one another in such a way that they are equal at the instant of cutting the label.

If the rotating parting element has one parting tool or two parting tools on its circumference, it may be substantially of a diamond shape, to the truncated pointed ends of which the parting tool or parting tools is/are fastened, This design has the advantage that masses that have to be moved in the case of a high circumferential speed of the parting element are small. If the rotating parting element has more than two parting tools, e.g. four, the rotating parting element can be realized, for example, as a substantially rectangular form, to the truncated edges of which the parting tools are respectively fastened. A further possible arrangement consists in the cylindrical design of the parting element, to the cylindrical surface of which the parting tools are fastened.

In order to minimize the wear on the parting tools as a result of contact with the vacuum roller during severing of the label, the parting tool may be resiliently mounted in the parting element.

According to an exemplary development of the invention, the gluing mechanism belonging to the labelling unit of the labelling machine consists of, at least, a tank, a heating system, a gluing roller and a gluing bar, the gluing mechanism being realized as a complete structural unit that can be exchanged in its entirety. This hot-gluing mechanism that can be exchanged in its entirety has the advantage that, in the case of the label adhesive being changed, cleaning of the tank, of the gluing roller and of the gluing bar, as well as cleaning of the adhesive guides, can be effected only after the gluing mechanism has been removed from the labelling unit, whereby the downtimes of the labelling machine can be reduced considerably. In some aspects, the gluing mechanism is fastened to the labelling unit with the aid of quick-action clamping elements, whereby a yet more rapid exchange operation is rendered possible.

An exemplary embodiment is explained in the following with reference to the figures.

DETAILED DESCRIPTION

Figure 1:
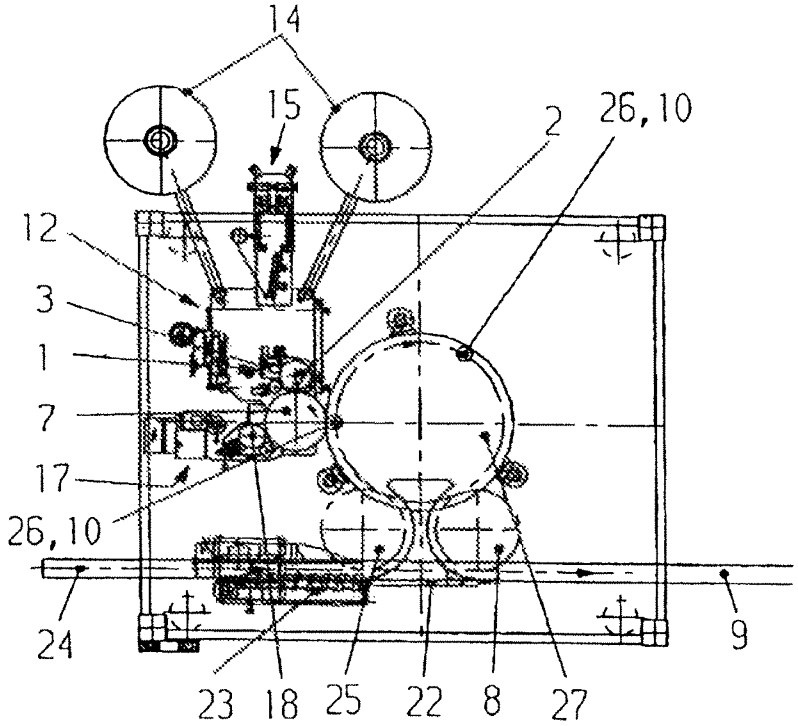
FIG. 1 shows a schematic top view of a labelling machine.

FIG. 1 shows a schematic top view of a labelling machine that enables all-round labels to be applied continuously, with high throughput, to bottles 10 fed continuously in a single-line series.

The labelling machine has a supply conveyor 24, an intake star wheel 25 with preceding spacing worm 23, a guide arc 22, a carousel 27 with a multiplicity of rotary discs 26 arranged at uniform intervals on a common segment of a circle, an outlet star wheel 8 and an outlet conveyor 9. The said transport elements, which move the bottles 10 through the machine, can be driven continuously in synchronism with one another in respect of speed and position.

In the circulation region between the intake star wheel 25 and the outlet star wheel 8, on the outer periphery of the carousel 27 there is a labelling unit 12 for applying all-round labels. The labelling unit 12 has two label roll receivers 14 with an interposed splicing-on station 15, a cutting device 1, a gluing mechanism 17, and a gripper cylinder 7 for transferring a previously cut label, glued on its forward and rearward edge, onto a passing bottle 10.

In detail, the operation of labelling a bottle 10 proceeds as follows:

A bottle 10 brought by the supply conveyor 24 is introduced, in combination with the laterally arranged spacing worm 23 so as to be correctly positioned, into the intake star wheel 25 and is pushed by the latter, in cooperation with the opposing guide arc 22, in continuous motion onto a rotary disc 26 of the rotating carousel 27. There, the bottle 10 is fixed axially on the rotary disc 26, so as to be rotatable with the latter, by a controlled centering cone, not represented, that can be raised and lowered relative to the rotary disc 26, and is brought by the circulatory motion of the carousel 27 tangentially onto the gripper cylinder 17 of the labelling unit 12.

An operation being performed at the same time as this is that whereby the label strip is drawn off one of the label strip rolls 14 in a controlled manner and guided past a sensor, not shown here, that identifies printed marks or a printed image, and, in the cutting device 1 connected to the sensor, is cut according to the printed image or the cut marks. After the parting operation, the parted label, which during the cutting operation is located with the printed image outwards on the rotating vacuum roller 2, is transferred to the vacuum-operated gripper cylinder 7, from which it is guided past the gluing roller 18 with its back side outwards and is provided with a glue strip on its start and end, respectively. This label, provided with the start and end glue strip, is fed tangentially to the carousel 27, on which the bottles 10 are located. The start glue strip is brought into contact with the bottle 10 and the label is wound on through rotation of the bottle 10 about its own axis, the end glue strip being glued-on either in an overlapping manner or edge-to-edge with the start of the label. The described application of the label is effected during continuous forward motion of the carousel 27.

After passing the labelling unit 12 and after completion of the winding-on operation, the labelled bottle 10, in its subsequent course, reaches the outlet star wheel 8 and is transferred to the outlet conveyor 9.

Figure 2:
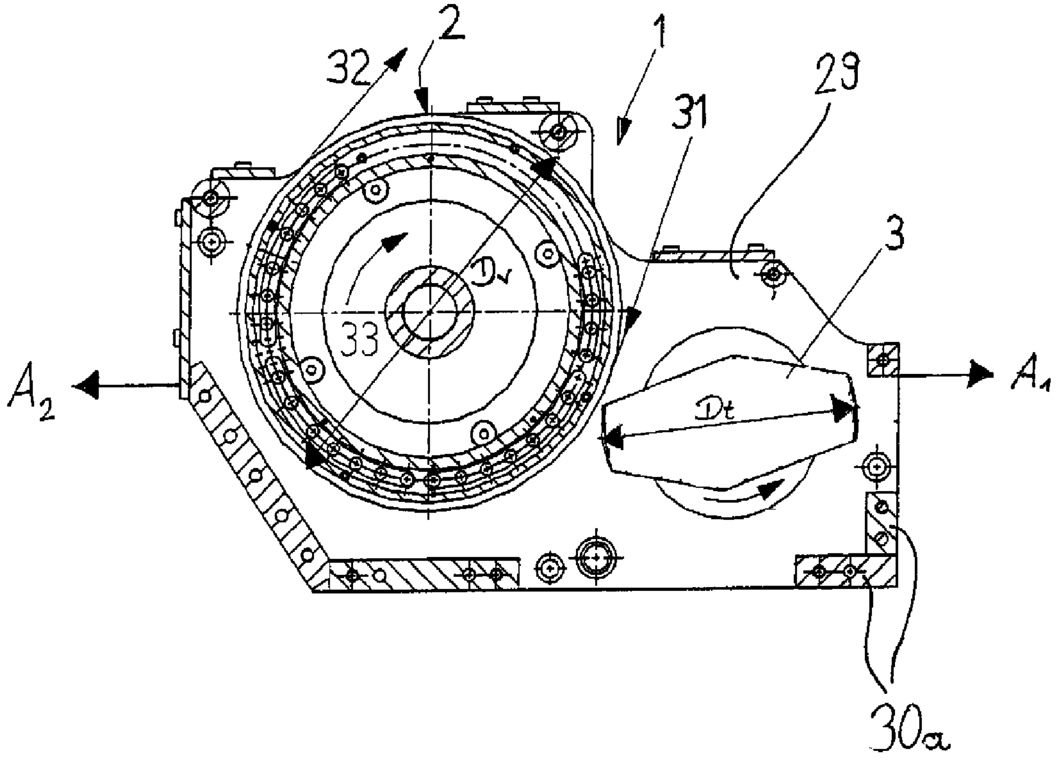
FIG. 2 shows a schematic top view of a cutting device of such a labelling machine.

FIG. 2 shows a detailed view of the cutting device 1 of the labelling unit 12. The label strip that is drawn off the label strip rolls 14 is fed tangentially to the cutting device 1 in the direction of the arrow 31 of the vacuum roller 2. The circumferential speed of the rotating vacuum roller 2 is equal to the delivery speed of the label strip, such that the transport of the label strip on the vacuum roller 2 is effected frictionally without slip. A print-image sensor or cut-mark sensor, not shown here, scans the label strip in respect of the locations to be cut and transmits its information directly to the drive unit of the parting element 3 and/or of the vacuum roller 2. A program control can determine the instant of cutting and thereby define the circumferential speed of the parting element 3 and/or of the vacuum roller 2. It is taken into account in this case that the circumferential speed of the parting tool 4 in the rotating parting element 3 is equal to the circumferential speed of the vacuum roller 2, and therefore also to the transport speed of the label strip. The base part 29 of the cutting device 1 can also be seen, the parts parting element 3 and vacuum roller 2, which are made, for example, mainly of aluminium, being mounted so as to be movable in rotation in the base part 29. The connecting elements 30*a* serve to connect the base part 29 and the cover part 30, not represented here, to each other. During high-speed operation, the aluminium components in the cutting device 1 heat up, such that thermal expansion results. Thus, owing to the change in volume caused by heating, the diameter Dv of the vacuum roller 2 becomes greater, in the same way as the diameter Dt of the parting element 3. This enlargement has the effect that the two components move "towards one another" by 30 to 60 micrometres, owing to the coefficients of thermal expansion determined for aluminium. Despite the resilient mounting of the parting tool in the parting element, this reduction in distance between the components would result in increased wear of same. For this reason, the support device 28 is also made, for example, of aluminium, such that, owing to the approximately equal coefficient of thermal expansion, there is obtained for the base part 29 an expansion in the direction A1 and A2 that approximately compensates for the reduction in distance between the vacuum roller 2 and the parting element 3. The same applies to the cover part, not shown here, which is also made of aluminium, for example.

Figure 3:
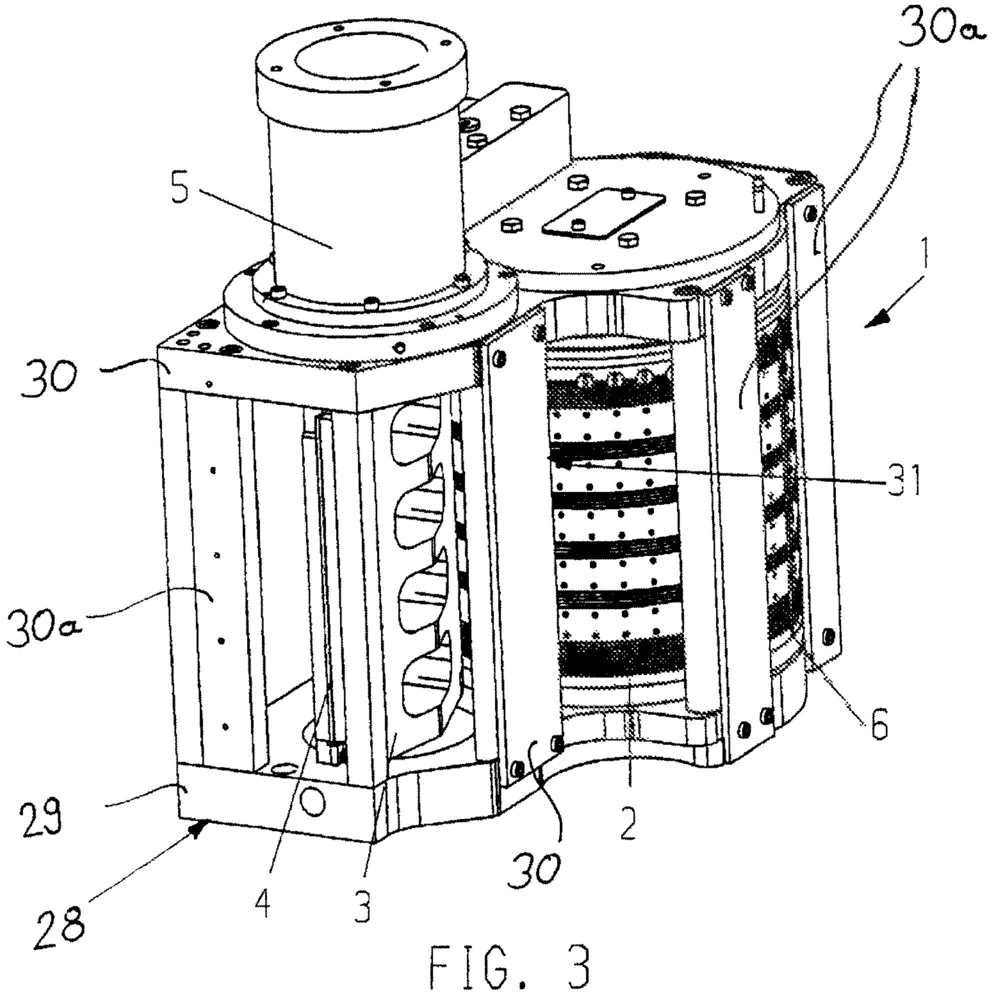
FIG. 3 shows a schematic perspective view of the cutting device.

FIG. 3 shows a perspective view of the cutting device 1 of the labelling unit 12. The label strip to be cut is fed to the vacuum roller 2 in the direction of the arrow 31. The vacuum roller 2 and the parting element 3 are driven by their own drive units, only the motorized drive unit 5 of the parting element 3 being shown here, in such a way that the parting tool 4 comes into engagement with the counter element 6 on the vacuum roller 2 at the instant of severing the label, the circumferential speed of the parting element 3 and that of the vacuum roller 2 being equal at that instant. The parting tool 4 in this case is resiliently mounted in the parting element 3 in order that, upon engaging with the counter element 6, it can effect parting with little wear on the parting tool and with gentle treatment of the label.

Figure 4:
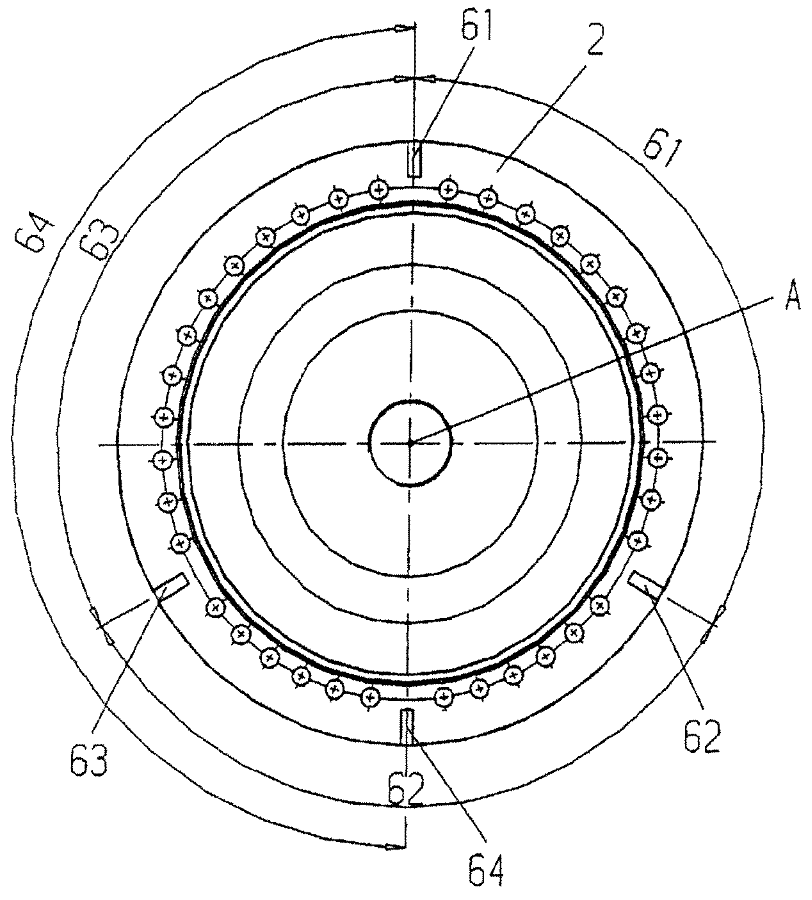
FIG. 4 shows a schematic top view of a vacuum roller in a labelling machine.

FIG. 4 shows a schematic top view of a vacuum roller 2, the counter elements 61, 62, 63, and 64 being inserted in the cylindrical surface of the vacuum roller 2, parallelwise in relation to the axis of rotation A of the vacuum roller 2. The spacing of the counter elements 61, 62 and 63 in relation to each other is so selected in this case that they enclose an angle of 120° in each case (63*a*, 62*a*, 61*a*). The fourth counter element 64 is likewise inserted in the circumferential surface of the vacuum roller 2, parallelwise in relation to the axis of rotation A of the vacuum roller, the fourth counter element 64 enclosing an angle 64*a* of 180° with the counter element 61. This arrangement of the counter elements 61 to 64 makes it possible to produce label lengths that correspond to the full circumference, three-quarters of the circumference, half of the circumference, and one third of the circumference, respectively, of the vacuum roller 2. This one vacuum roller 2, and the counter elements 61 to 64 mounted therein, makes it possible for variously structured gripper cylinders 7 to be loaded. The loadable gripper cylinders 7 may also be such that can accommodate either two labels corresponding to the circumference of the vacuum roller, or three labels corresponding to two-thirds of the circumference of the vacuum roller, or four labels corresponding to one half of the circumference of the vacuum roller, or six label corresponding to one third of the circumference of the vacuum roller.

Figure 5:
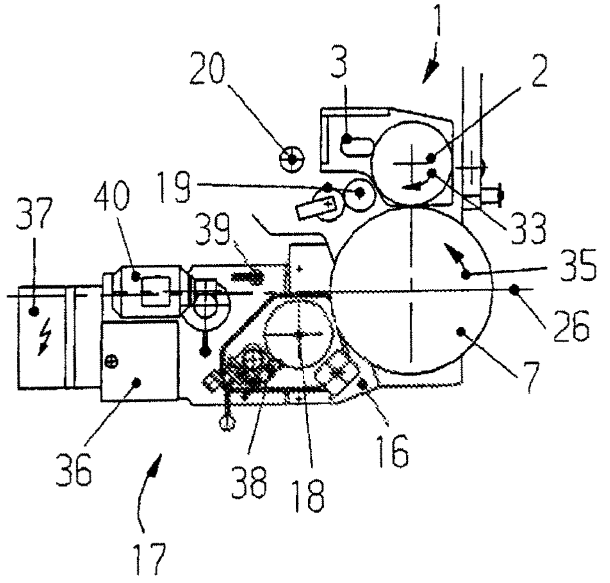
FIG. 5 shows a schematic top view of a gluing mechanism and a cutting device.

FIG. 5 shows a schematic top view of the cutting device 1 and of the gluing mechanism 17. The label strip drawn off the label strip rolls 14 is fed, via the deflection roller 20 and the roller pair 19, to the cutting device 1. There, the label strip lies on the vacuum roller 2, which rotates in the direction of the arrow 33, and it is cut by the parting element 3 according to the cut marks or printed image.

These label pieces are transferred to the gripper cylinder 7, which rotates in the direction of the arrow 35. The gripper cylinder 7, which holds the labels on its circumferential surface by means of vacuum, has elevations on its cylindrical surface that receive, respectively, the start and the end of the label piece. The result of this fact is that, in the case of differing label lengths, it is necessary for other gripper cylinders 7 to be used in order to match the elevations to the label lengths.

As the label pieces present on the gripper cylinder are being moved past the gluing roller, the said elevations cause the start and the end of the label piece to be pressed onto the gluing roller in each case, and thereby to receive a glue strip. These glue strips are required for gluing the label pieces to the item to be labelled. Transfer of the label piece provided with the glue strip is effected at the location at which the rotary disc 26 is shown in FIG. 5.

A gluing mechanism 17 is required to enable the label piece to be provided with glue strips, as has just been described. The gluing mechanism 17 consists of a glue tank 36, a glue heating system 37, a gluing bar 38, a glue pump 40 and quick-action clamping elements 39. The hot glue, which has been put into the glue tank 36 and liquefied by means of the glue heating system 37, and which is therefore workable, is pumped out of the glue tank 36 by means of the glue pump 40 and fed to the gluing roller 18, on its cylindrical surface. The gluing bar 38 is placed so close to the gluing roller 18 that, as the gluing roller 18 rotates, this gluing bar draws off the excess glue, and only a thin film of glue remains on the cylindrical surface of the gluing roller 18. The glue remaining on the gluing bar 38 is fed back to the glue tank 36, such that a glue circuit is produced.

The components belonging to the gluing mechanism 17 that have just been described are mounted on a gluing mechanism base plate 16. The gluing mechanism base plate 16 can be mounted in its entirety on the labelling unit 12. For this purpose, it is placed on two bars of the labelling unit 12, which are not shown here, and fastened to these two bars by means of a quick-action clamping element 39. Release of the quick-action clamping element 39 enables the gluing mechanism base plate 16, with all its components, to be removed from the labelling unit and replaced by another gluing mechanism.

It will be apparent to those skilled in the art that various modifications and variations can be made to the labelling apparatus of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. Labelling machine for labelling containers, comprising:
- a container feed device;
- a labelling region;
- a container removal device; and
- at least one labelling unit for processing labels from a roll, the labelling unit including
  - at least one label roll,
  - a label feeder,
  - a gripper cylinder,
  - at least one gluing mechanism,
  - a cutting device, the cutting device comprising a rotating vacuum roller and a rotating parting element which, on its circumference, has at least one parting tool, and
  - a common support device holding the cutting device, the common support device having a base part and a cover part, the rotating vacuum roller and the rotating parting element being rotatably mounted to the base part in a desired spaced apart relationship relative to one another in a non-thermally-expanded condition,
- wherein the support device comprises a plurality of different materials, the support device having a mean coefficient of thermal expansion corresponding substantially to the mean coefficient of thermal expansion of the rotating vacuum roller and the rotating parting element such that, when in a thermally-expanded condition, expansion of the support device compensates for expansion of the rotating vacuum roller and the rotating parting element to maintain the rotating vacuum roller and the rotating parting element substantially in said desired spaced apart relationship.

2. Labelling machine according to claim 1, wherein the at least one parting tool comprises a cutting blade.

3. Labelling machine according to claim 1, wherein the materials of the base part and of the cover part of the cutting device are substantially the same.

4. Labelling machine according to claim 1, wherein the cutting device, the vacuum roller, and the base part and cover part are produced from substantially the same material having substantially equal coefficients of thermal expansion.

5. Labelling machine according to claim 4, wherein the material of the base part and the cover part, as well as the vacuum roller and the rotating parting element, includes aluminum.

6. Labelling machine according to claim 4, wherein the material of the base part and the cover part, as well as the vacuum roller and the cutting device, includes steel.

7. Labelling machine according to claim 6, wherein the steel is stainless steel.

8. Labelling machine according to claim 1, further comprising:
- counter elements mounted on the rotating vacuum roller, the parting tool being structured and arranged to be brought into contact with the counter elements for the purpose of severing the label.

9. Labelling machine according to claim 1, wherein the rotating parting element comprises two parting tools.

10. Labelling machine according to claim 9, wherein the two parting tools comprise two cutting blades for severing the label.

11. Labelling machine according to claim 1, wherein the rotating vacuum roller comprises at least two counter elements, which can be brought into contact with the parting tool for the purpose of severing the label.

12. Labelling machine according to claim 1, wherein the rotating vacuum roller comprises four counter elements, which can be brought into contact with the parting tool for the purpose of severing the label.

13. Labelling machine according to claim 12, wherein the four counter elements are so arranged that three counter elements are mounted on the circumference of the rotating vacuum roller with a respective spacing of 120° , and the fourth counter element has a spacing of 180° from one of the three counter elements.

14. Labelling machine according to claim 1, wherein the rotating vacuum roller is the counter element for severing the label.

15. Labelling machine according to claim 1, wherein the rotating vacuum roller and the rotating parting element are each equipped with their own motorized drive.

16. Labelling machine according to claim 15, wherein at least one of the motorized drives comprises a servo drive.

17. Labelling machine according to claim 1, wherein the rotating vacuum roller and the rotating parting element can be driven at the same circumferential speed at the instant of cutting.

18. Labelling machine according to claim 1, wherein the rotating parting element is substantially of a diamond shape, the at least one parting tool being fastened to truncated pointed ends of the diamond-shaped parting element.

19. Labelling machine according to claim 1, wherein the parting tool is resiliently mounted in the rotating parting element.

20. Labelling machine according to claim 1, the at least one gluing mechanism including a glue tank, a glue heating system, a gluing roller and a gluing bar, the gluing mechanism being a single structural unit that can be exchanged in its entirety.

21. Labelling machine according to claim 20, wherein the gluing mechanism is securable to the labelling unit via at least one quick-action clamping element.

22. Labelling machine according to claim 1, wherein the rotating vacuum roller and the rotating parting element are mounted to the base part such that thermal expansion of the rotating vacuum roller and the rotating parting element causes a surface of the rotating vacuum roller and a surface of the rotating parting element to become closer to one another than said desired spaced apart relationship, and wherein thermal expansion of the base part and the cover part of the support device moves the rotating vacuum roller and the rotating parting element away from one another to maintain the rotating vacuum roller and the rotating parting element substantially in said desired spaced apart relationship.

23. Labelling machine for labelling containers, comprising:

a container feed device;

a labelling region;

a container removal device; and at least one labelling unit for processing labels from a roll, the labelling unit including at least one label roll, a label feeder, a gripper cylinder, at least one gluing mechanism, a cutting device, the cutting device comprising a rotating vacuum roller and a rotating parting element which, on its circumference, has at least one parting tool, and a common support device holding the cutting device, the common support device having a base part and a cover part, the rotating vacuum roller and the rotating parting element being rotatably mounted to the base part in a desired spaced apart relationship relative to one another in a non-thermally-expanded condition, wherein the base part is constructed of a plurality of materials, each of said materials have a differing coefficient of thermal expansion, said base part having a mean coefficient of thermal expansion, the mean coefficient of thermal expansion of the base part being approximately equal to the mean coefficient of thermal expansion of the cover part, the vacuum roller, and the rotating parting element such that during high speed operation of the machine, thermal expansion of the base part and the cover part of the support device compensates for expansion of the rotating vacuum roller and the rotating parting element to maintain the rotating vacuum roller and the rotating parting element substantially in said desired spaced apart relationship.

* * * * *